(12) United States Patent
Lundy et al.

(10) Patent No.: US 7,293,064 B1
(45) Date of Patent: Nov. 6, 2007

(54) METHOD AND SYSTEM FOR DYNAMIC VARIATION OF ORGINAL MESSAGE LENGTH IN A REPLY MESSAGE

(75) Inventors: Michael T. Lundy, Olathe, KS (US); Steven W. Rivers, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 851 days.

(21) Appl. No.: 10/676,642

(22) Filed: Oct. 1, 2003

(51) Int. Cl.
*G06F 15/16* (2006.01)

(52) U.S. Cl. .................. 709/206; 709/207; 715/752

(58) Field of Classification Search ........... 709/206, 709/207; 379/67.1; 715/752, 753
See application file for complete search history.

(56) References Cited

U.S. PATENT DOCUMENTS

| | | | |
|---|---|---|---|
| 6,938,076 B2 * | 8/2005 | Meyer et al. | 709/219 |
| 2002/0054335 A1 * | 5/2002 | Sekiguchi | 358/1.15 |
| 2003/0081557 A1 * | 5/2003 | Mettala et al. | 370/252 |
| 2004/0090457 A1 * | 5/2004 | Serdy et al. | 345/752 |

* cited by examiner

*Primary Examiner*—Frantz B. Jean (57) ABSTRACT

A method and system for generating a reply message limited to a maximum number of characters based on a dynamic variation of an original message length. A messaging client receives the original message and delivers the original message text for presentation to a user. If the user opts to reply to the original message, the messaging client generates the reply message by including the user's reply message text and only so much of the original message text as will fit in a remaining capacity of the reply message. The method and system is particularly useful in a Short Message Service (SMS) messaging system, but may be useful in other systems as well.

20 Claims, 6 Drawing Sheets

METHOD AND SYSTEM FOR DYNAMIC VARIATION OF ORGINAL MESSAGE LENGTH IN A REPLY MESSAGE

BACKGROUND

1. Field of the Invention

The present invention relates to telecommunications and, more particularly, to generating and sending of messages.

2. Description of Related Art

In certain messaging systems, when a user opts to reply to a message, a messaging client can be arranged to automatically include in the user's reply message a copy of the original message. For instance, when the user opts to reply to a message, the client may generate and present to the user a reply template that includes a copy of the original message text, and the user may then type reply message text into the template, typically before the original message text. The client may then send the reply message, including the reply message text and the original message text, to the original sender.

This process works perfectly well in a scenario where messages are not restricted to a maximum size limit. That is, if the body of a reply e-mail message is not subject to a maximum size limit, no difficulty arises from including original message text in a reply e-mail message together with the reply message text.

A problem can arise, however, in a scenario where messages are limited to a maximum length. For instance, in a Short Message Service (SMS) messaging system that operates under current industry standards (e.g., TIA/EIA-637 and variants thereof), the body of each SMS message is typically limited to a maximum of 160 characters. Given this maximum size limitation, the inclusion of original SMS message text in a reply SMS message would necessarily decrease the capacity available for the reply message text. For example, if the original message is 40 characters long, then a space of only 120 characters would be left for the reply message text. (Further, if a text heading such as "ORIGINAL MESSAGE:" is included to introduce the original message, even less space would be left for the reply message text.)

One partial solution to this problem may be to have the messaging client include just a predefined part of the original message in the reply message. For instance, with a 160 character limit, a messaging client could be set to include only the first 20 characters of an original message in every reply message, thereby leaving 140 characters for use as reply message text. This solution would be undesirable, however, because it would always remove that predefined amount of capacity from every reply message. Further, it would be undesirable, because it would arbitrarily limit the amount of the original message that is included.

SUMMARY

The present invention provides a better solution. According to an exemplary embodiment of the invention, a messaging client will include only so much of the original message text as will fit in the reply message with at least the reply message text. (For purposes of this invention, the original message text could be considered to also include any desired header, such as "ORIGINAL MESSAGE:" as well as any desired spacing between it and the reply message text.) Thus, given a maximum message capacity of M characters and given reply message text of R characters, the messaging client would include only M-R characters of the original message text in the reply message.

The messaging client could carry out this function in any of a variety of ways. For example, the messaging client could first receive the user's reply message text and could then append as much of the original message text as would fit after the reply message text, within the maximum message capacity. As another example, the messaging client could allow the user to type the reply message text into a template containing the original message text and could (i) dynamically shift out the end characters of the original message text as the user types the reply message or (ii) truncate as much as necessary of the original message text after the user finishes composing the reply message.

Further, if the number of characters in a portion of the original message text that fits in the reply message is less than a threshold number, then the messaging client could omit the original message text altogether. This additional limitation could prevent a scenario where only a trivial extent (e.g., only several characters) of the original message text is included in the reply message. In this regard, the threshold could be predefined and fixed. Alternatively, the threshold could be dynamically set.

These as well as other aspects and advantages will become apparent to those of ordinary skill in the art by reading the following description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
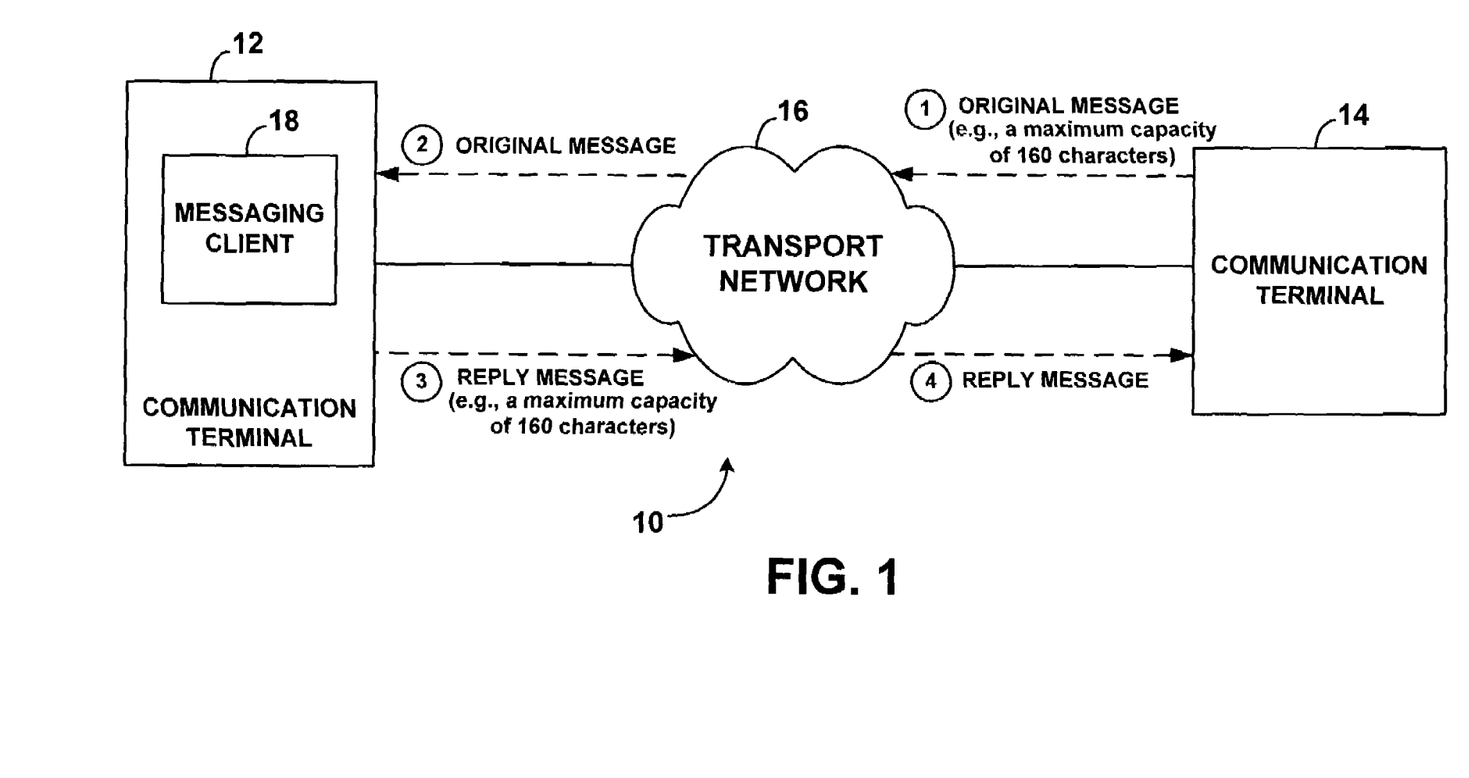
FIG. 1 is a block diagram of a system in which an exemplary embodiment of the present invention can be implemented.

Referring to the drawings, FIG. 1 is a block diagram of a basic system in which an exemplary embodiment of the present invention can be implemented. The system includes a plurality of communication terminals, of which exemplary terminals 12 and 14 are shown, coupled via suitable links to a transport network 16. Further, FIG. 1 depicts terminal 12 comprising a messaging client 18. Other entities might reside on or be accessible via transport network 16 as well.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and various functions could be carried out by software, firmware and/or hardware logic.

Referring back to FIG. 1, transport network 16 may be a single network, such as a wireless network or a landline network, or a combination of networks interconnected together via appropriate interfaces and/or various network elements. Each of the plurality of communication terminals may take various forms, examples of which include a landline or wireless desktop computer, or a handheld device such as a mobile wireless data terminal (e.g., mobile phone or personal data assistant (PDA)), equipped with suitable means to communicate with other entities over transport network 16. In this regard, each terminal may engage in various forms of communications (e.g., voice and/or data communications), using any of a variety of compatible messaging protocol(s) known in the art.

One of such communications may be a transmission and reception of messages, which are restricted to a maximum size limit. These limited-size messages, typically comprising alphanumeric characters, may be then presented as text messages to communication users. By way example, FIG. 1 shows terminal 12 and terminal 14 configured to exchange limited-size messages (e.g., a maximum capacity of 160 characters) over transport network 16. The messages may be sent directly from one terminal to the other or, alternatively, may be forwarded by some intermediate network element(s) not shown.

As generally depicted in FIG. 1, terminal 14 may originate a message, either automatically or with a user interaction, and send the original message to terminal 12 over transport network 16. Although this example arrangement assumes that the message originated at terminal 14 is limited to a maximum size, it is equally possible that the original message may not be restricted to any size limit. In this case, possibly a portion of the original message may be delivered to terminal 12 that imposes a size limitation on the received messages. Alternatively, the original message may be divided into a sequence of messages sent to terminal 12. Other examples are possible as well.

Terminal 12 preferably comprises a logic element (e.g., software, hardware and/or firmware) such as messaging client 18 that can operate to receive the original message, to generate a reply message that does not exceed a maximum message capacity, and to send the reply message to terminal 14.

Figure 2:
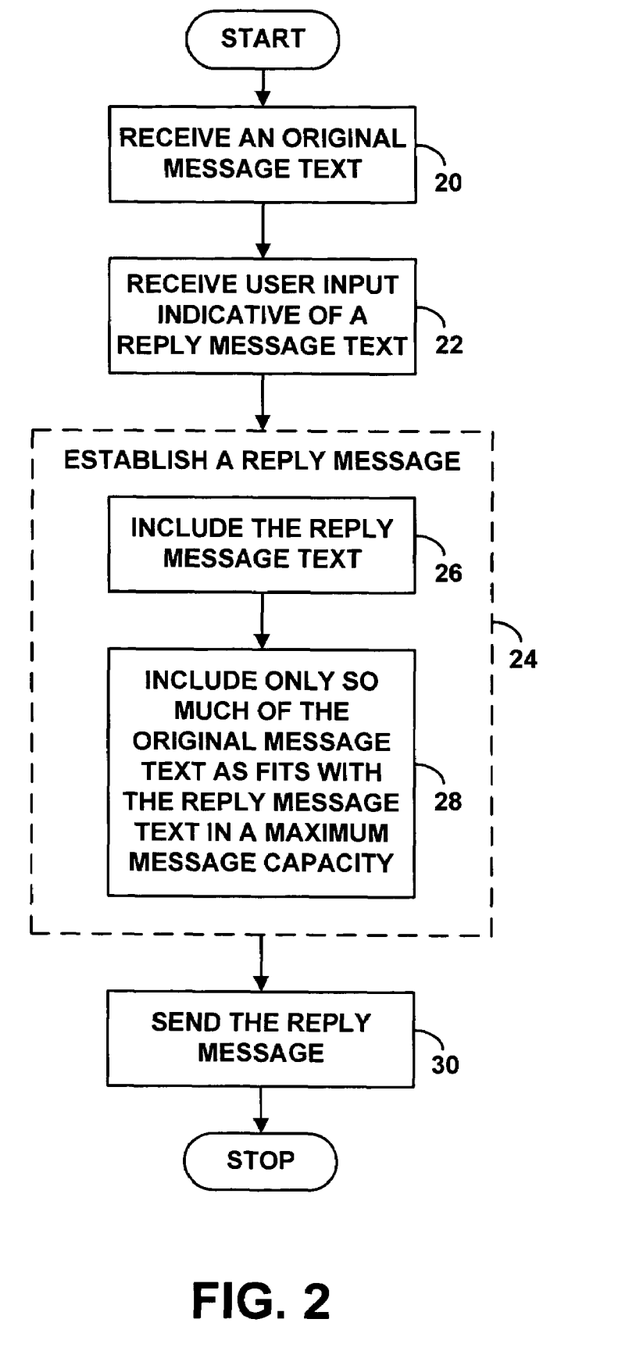
FIG. 2 is a flow chart depicting a set of functions that can be carried out in accordance with an exemplary embodiment.

FIG. 2 is a flow chart generally depicting a set of functions that could be carried out in accordance with an exemplary embodiment, in the arrangement shown in FIG. 1 for instance.

When an original message arrives at terminal 12, at step 20, messaging client 18 receives the original message text. Messaging client 18 could be programmed to present the original message text to a user and, at step 22, to receive an input from the user indicative of a reply message text.

After or concurrently with receiving the user input, at step 24, messaging client 18 could establish the reply message by including the user's reply text and only so much of the original message text as will fit in a remaining capacity of the reply message. As such, at step 26, the messaging client 18 may include the entire reply message text (assuming the reply message text itself does not exceed a maximum capacity of the reply message) and then, at step 28, may possibly include the original message text or a portion thereof that fits together with the reply message text in the maximum capacity of the reply message.

Figure 3:
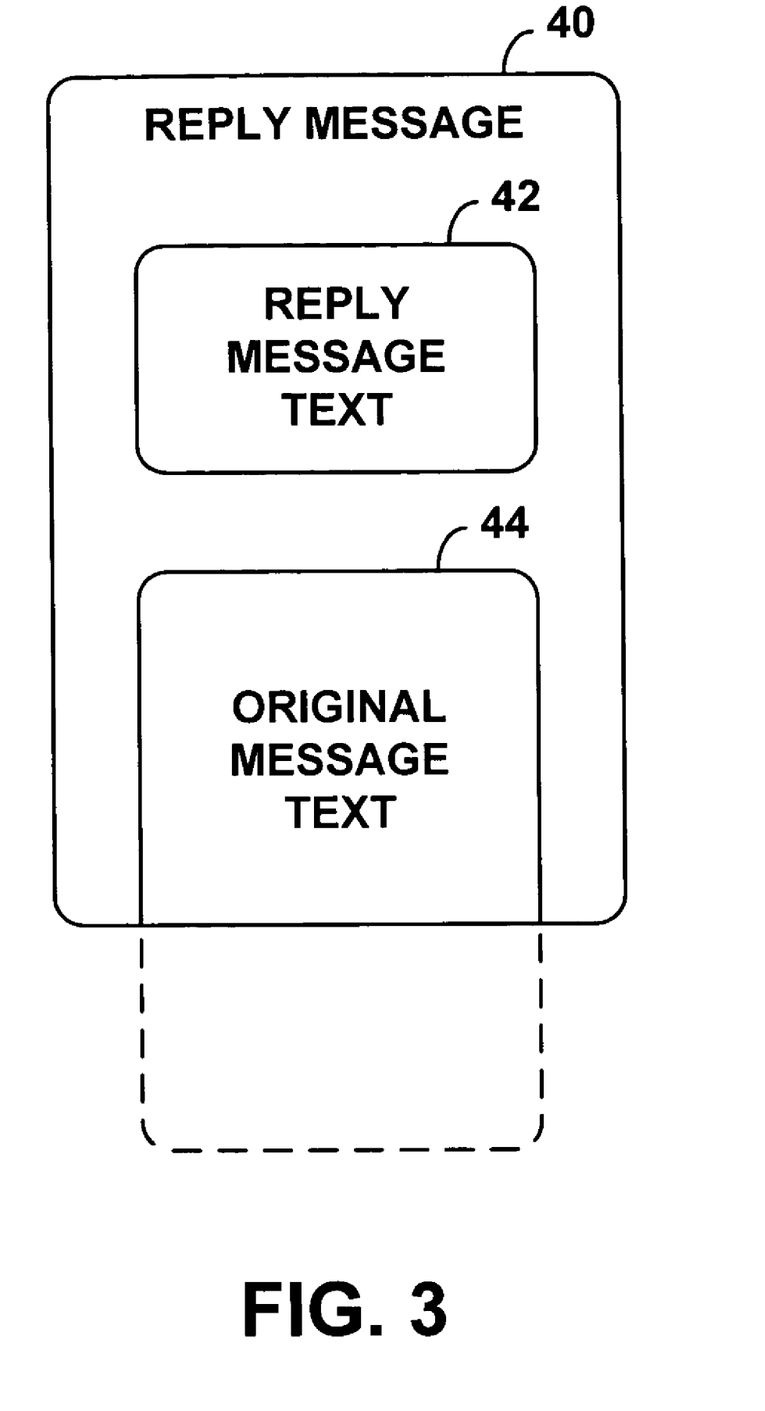
FIG. 3 is a block diagram of an exemplary reply message.

FIG. 3 illustrates an exemplary reply message established in this manner. As shown, a reply message 40 includes reply message text 42 and only a portion of original message text 44 that fits within the reply message 40 with at least the reply message text 42. By way of example, reply message 40 may also include any desired spacing between the reply message text 42 and the original message text 44 and/or any desired header of the original message, such as "ORIGINAL MESSAGE:".

Finally, at step 30, messaging client 18 of terminal 12 may send the reply message to terminal 14 over transport network 16. The reply message may be directed through the same network path that the original message traversed, or possibly, through a different network path.

2. Exemplary Architecture

Figure 4:
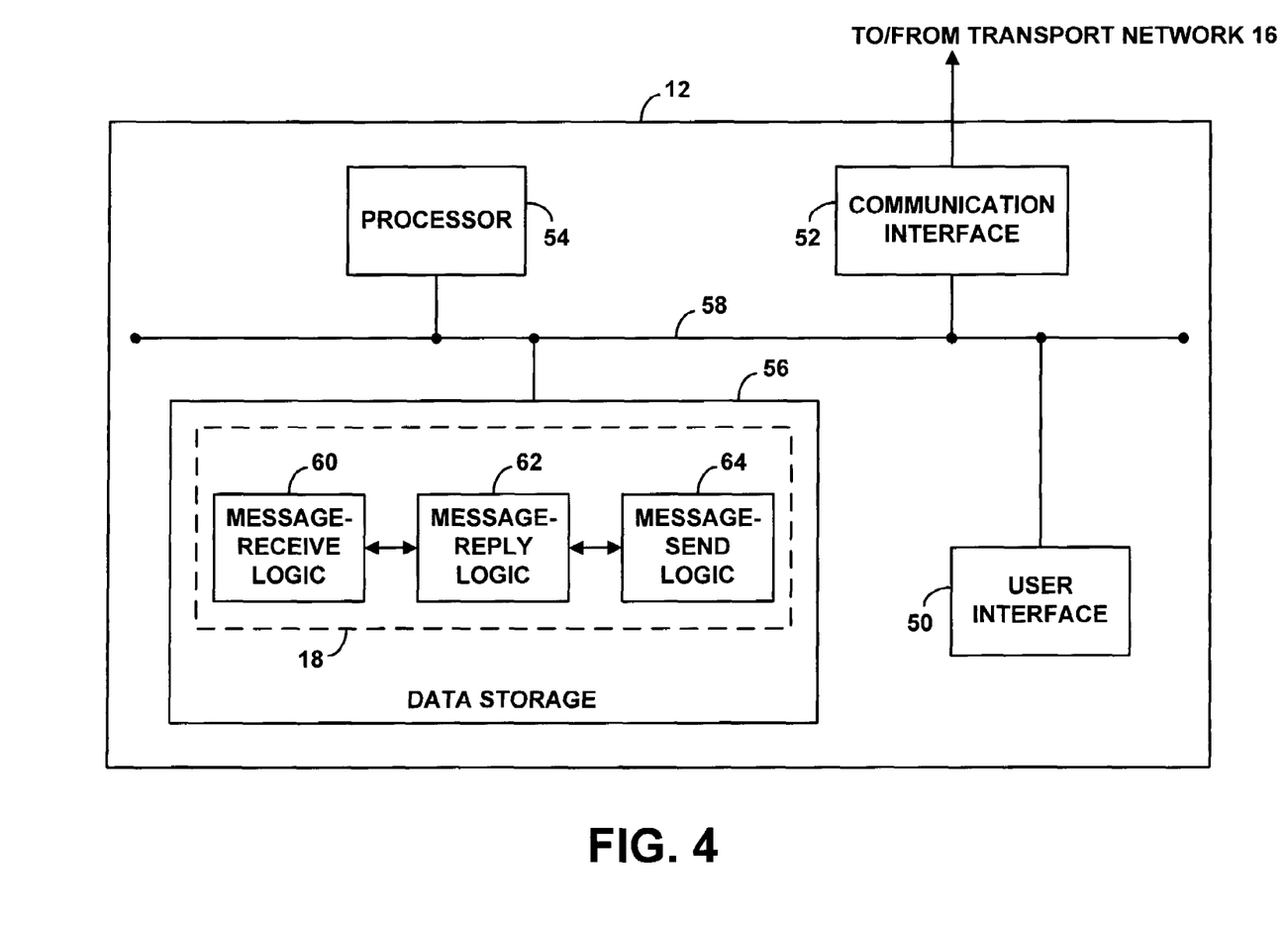
FIG. 4 is a block diagram of an exemplary communication terminal.

While FIG. 1 depicts a generalized arrangement of entities operating in accordance with an exemplary embodiment of the present invention, FIG. 4 illustrates in greater detail a representative communication terminal 12 arranged to perform functions described herein.

As depicted in FIG. 4, terminal 12 includes components such as a user interface 50, a communication interface 52, a processor 54 and data storage 56, all tied together via a system bus or other mechanism 58.

User interface 50 may facilitate interaction with a user, such as presenting to the user an original message text and receiving from a user an input indicative of a reply message text. As such, the user interface might include input mechanisms such as a keyboard, keypad, mouse, microphone and/or touch-sensitive display overlay, as well as output mechanisms such as a display or a speaker.

Communication interface 52, in turn, may facilitate communication over a respective link with another network entity, for purposes of receiving and sending communication information, including limited-size text messages. The communication interface can take various forms. For example, if the user station is a wireless mobile station, the communication interface may include an antenna (not shown) for sending and receiving radio frequency signals over an air interface, as well as a chipset compliant with a suitable communication protocol (such as CDMA, TDMA, GSM or 802.11x, for instance). As another example, if user station is landline personal computer, the communication interface might comprise an Ethernet network interface card.

Processor 54 may be one or more general purpose processors (such as Intel Pentium class processors or better) and/or dedicated processors (such as digital signal processors), and data storage 56 may be any sort of storage, whether volatile and/or nonvolatile. For instance, data storage 56 may be flash memory and/or a storage drive.

Data storage 56 preferably holds a set of logic (e.g. machine language instructions and reference data) executable by processor 54 to carry out various functions described herein. As shown in FIG. 4, data storage includes exemplary messaging client 18, which may be a logic module that implements (e.g., causes processor 54 to implement) a user agent application for receiving original text messages into terminal 12, delivering the messages for presentation to a user and generating reply messages for transmission to other network entities, such as terminal 14.

Messaging client 18 may comprise message-receive logic 60, message-reply logic 62, and message-send logic 64. Although FIG. 4 depicts these three elements as functionally integrated in a single logic module (e.g., as program routines in a single application), it is also possible that the three could be distinct modules. Additionally, other logic not shown could exist to coordinate the functions of message-receive logic 60, message-reply logic 62, and message-send logic 64.

3. Exemplary Operation

Message-receive logic 60 of messaging client 18 may function to receive an original message text and to present it to a user operating terminal 12, either automatically or in response to a user request. If the user chooses to reply to the original message, the user may, for instance, activate a "REPLY" soft button or any other type of trigger indicative of user's desire to compose a reply message. Responsive to such trigger, message-reply logic 62, in turn, may function to process user input defining reply message text and to establish the reply message accordingly. This could be done in a variety of ways.

In one exemplary embodiment, message-reply logic 62 may contain program instructions to first allow the user to enter the complete reply message text. As the user enters the text, message-reply logic 62 may keep a running count of characters in the current reply message text and a count of characters remaining in a given message capacity of the reply message (i.e., the maximum capacity of the reply message less the current count of characters in the reply message text). After the user completes the message by pressing a "DONE" soft button or the like, message-reply logic 62 may then insert into the reply message as many characters of the original text as are still available in the maximum capacity of the reply message. Message-reply logic 62 may then invoke message-send logic 64 to send the reply message.

Alternatively, message-reply logic 62 may contain program instructions to generate a reply template that contains the original message text and allow the user to type the reply message directly into the template. If the original message capacity is at a maximum size limit (e.g., 160 characters) of the reply message, message-reply logic 62 may dynamically shift out the end characters of the original message as the user types the reply message. That is, for each additional character (e.g., an alphanumeric character or a space) the user enters into the template, message-reply logic 62 may responsively shift out one end character of the original message text. Otherwise, message-reply logic 62 may be programmed to truncate as much as necessary of the original message text after the user finishes composing the reply message.

Figure 5:
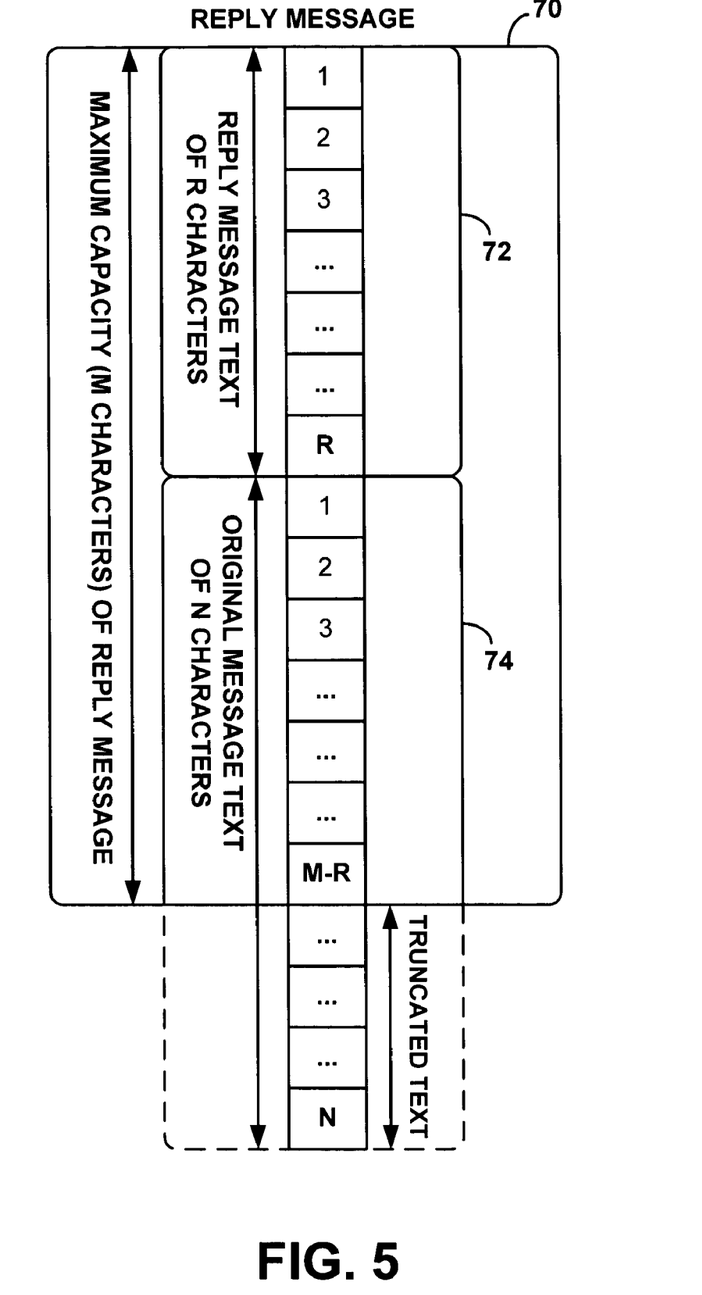
FIG. 5 is a block diagram of one example of establishing a reply message.

FIG. 5 illustrates one exemplary embodiment, in which message-reply logic 62 is programmed to establish a reply message 70 by concatenating reply message text 72 and original message text 74, and then truncating a portion of the original message text 74. As shown in FIG. 5, the reply message text 72 contains R characters and the original message text 74 contains N characters. The N characters of the original message text 74 could be considered to include the body of the original message and possibly any desired header of the original message, as well as any desired spacing between the original message and the reply message text 72.

Given a maximum message capacity of M characters, message-reply logic 62 will be able to include only M characters in reply message 70. Consequently, message-reply logic 62 may function to fit the reply message text 72 and M-R characters of the original message text 74 into reply message 70. Message-reply logic 62 will then truncate any remaining characters of the original message text 74. By way of example in FIG. 5, message-reply logic 62 would truncate N-(M-R) characters of the original message text 74.

It is of course possible that the R number of characters in the reply message text 72 could equal the maximum message capacity M. In this case, message-reply logic 62 would simply omit the original message text 74 from reply message 70. It is also possible that only a trivial amount of the original message text 74 (e.g., only a few characters or so) may remain after the truncating operation. In this situation, message-logic 62 could omit those characters from reply message 70.

To facilitate establishing the reply message in those situations where only a small portion of the original message text fits after the reply message text in the reply message, message-reply logic 62 may define a threshold to determine if any of the original message text should be included in the reply message. More particularly, after including the reply message text in the reply message, message-reply logic 62 may further apply a program routine to determine if the portion of the original message text that fits in the remaining capacity of the reply message is big enough to justify including.

In one example, the program routine could be arranged to count the number of characters in the portion of the original message text that fits in the reply message and compare it to a threshold number. If the counted number of characters is less than the threshold number, then message-logic 62 could omit the original message text from the reply message. The threshold could be predefined and fixed or, alternatively, dynamically established to allow inclusion of either minimum usable amount of the original message text (e.g., an amount that might give a reader a sense of what the original message concerns) or none of the original message text.

In this regard, message-reply logic 62 may further contain a program subroutine that is arranged to dynamically establish the threshold number of characters based on words in the original message itself. For example, the subroutine could be arranged to dynamically set the threshold to be the number of characters that make up a particular number of starting words of the original message text, such as the first three words of the message text for instance. This way, if the remaining capacity in the reply message is not sufficient to hold at least those starting words of the original message text, the message-reply logic 62 could simply omit the original message text altogether.

To dynamically set the threshold in this manner, the subroutine could be arranged to count the number of characters in the designated number of starting words and to set the threshold to be that number. For instance, if the number of starting words is three, then the subroutine could count the number of characters in the original message text up to the space after the third word and could set the threshold to be that number of characters. Other mechanisms for dynamically establishing a threshold could be used as well.

4. Exemplary Application

While system 10 is generically representative of an arrangement in which an exemplary embodiment can be implemented, various details are possible.

As one example, the present invention is particularly advantageous for use with SMS messages that are limited to a maximum number of characters. As defined by TIA/EIA 637-A and/or other industry standards, SMS allows the exchange of short messages between a mobile station (e.g., a wireless handheld device such as a mobile phone) and a wireless network, and between the wireless network and an external device (e.g., a data terminal). By way of example, FIG. 6 illustrates in more detail a block diagram of a representative communication system 80 in which an exemplary embodiment of the present invention can be implemented.

Figure 6:
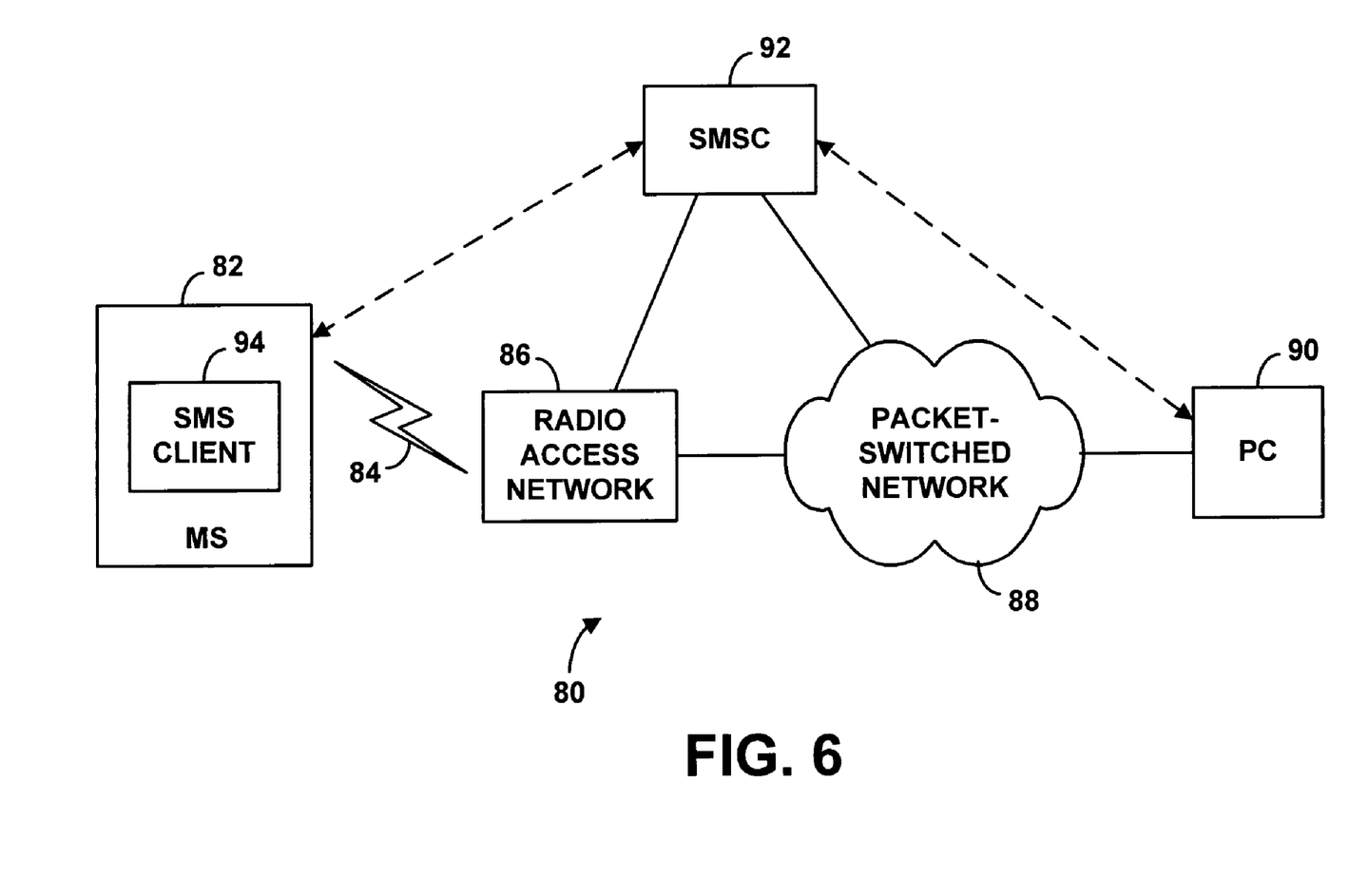
FIG. 6 is a block diagram depicting in more detail a communication system in which an exemplary embodiment of the present invention can be employed.

As illustrated in FIG. 6, communication system 80 comprises a mobile station (MS) 82 that communicates over an air interface 84 with a radio access network 86. Radio access network 86 is coupled to a packet-switched network 88, which, in turn, is coupled to a personal computer (PC) 90. MS 82 may thus communicate with PC 90 via a communication path comprising the air interface, the radio access network, and the packet-switched network. In addition, a short messaging service center (SMSC) 92 is shown to reside on both radio access network 86 and packet-switched network 88.

Under TIA/EIA 637-A and/or other industry standards, the SMSC can receive, store and forward SMS messages to short messaging entities such as SMS-capable mobile stations for instance. MS 82, in the exemplary arrangement, can be an SMS-capable mobile station. As shown in FIG. 6, MS 82 includes an SMS client 94.

Although not shown, MS 82 is preferably equipped with a wireless transceiver for receiving SMS messages delivered by radio access network 86 over air interface 84 and transmitting SMS messages to radio access network 86 over air interface 84. The MS may also include a display for displaying SMS message text to a user and any suitable user interface (e.g., a keypad) for receiving inputs from a user. For instance, if the user wishes to compose an SMS message, the user may input the message text using such interface.

In an exemplary embodiment, a message may be originated from PC 90 (e.g., by way of e-mail or any other suitable means) for delivery to MS 82. The message may be sent over packet-switched network 88 to SMSC 92, which in turn may forward the message through radio access network 86 to MS 82. Although not shown, SMSC 92 may typically query a Home Location Register (HLR) that stores service profiles for wireless subscribers, to obtain current location of MS 82 within radio access network 86 and to route the message to MS 82 accordingly.

SMS client 94 of MS 82 can be an SMS application program arranged to receive, compose, store, act upon, display or otherwise manage short text messages that are limited to a maximum length. According to the exemplary embodiment of the present invention, SMS client 94 can be arranged to receive the original message and display it to a user of MS 82. If the user opts to reply to the message, SMS client 94 can generate a reply message by including the user's reply message text (and possibly any desired header text and/or any desired spacing between the user's reply message text and the original message text) and only so much of the original message text as will fit in a remaining capacity of the reply message. SMS client 94 can then send the reply message for delivery to PC 90.

5. Conclusion

Exemplary embodiments of the present invention have been described above. Those skilled in the art will understand, however, that changes and modifications may be made to these embodiments without departing from the true scope and spirit of the present invention, which is defined by the claims.

What is claimed is:

1. A communication terminal having a messaging client comprising:
   a receive-routine for receiving an original message comprising original message text;
   a reply-routine for receiving user input defining reply message text and for establishing a reply message comprising the reply message text and only so much of the original message text as will fit together with at least the reply message text in a maximum message capacity; and
   a send-routine for sending the reply message.

2. The communication terminal of claim 1, wherein the reply-routine receives the reply message text and then inserts after the reply message text only so much of the original message text as will fit together with at least the reply message text in the maximum message capacity.

3. The communication terminal of claim 1, wherein the reply-routine concatenates at least the reply message text and the original message text and then truncates a portion of the original message text so that the reply message does not exceed the maximum message capacity.

4. The communication terminal of claim 1, wherein the reply-routine determines whether a threshold extent of the original message text fits within the maximum message capacity together with at least the reply message text, and the reply-routine omits the original message text altogether from the reply message in response to a determination that the threshold extent does not fit within the maximum message capacity together with at least the reply message text.

5. The communication terminal of claim 4, further comprising:
   a threshold-determination routine for dynamically setting the threshold.

6. The communication terminal of claim 5, wherein the threshold-determination routine dynamically establishes the threshold by a process comprising determining a number of characters in a predefined starting portion of the original message text.

7. The communication terminal of claim 6, wherein the predefined starting portion of the original message text is a predefined number of starting words of the original message text.

8. The communication terminal of claim 1, embodied as machine language instructions recorded on a machine readable medium.

9. The communication terminal of claim 8, wherein the machine language instructions define a Short Message Service (SMS) application program.

10. A method comprising:
    receiving into a messaging client an original message comprising original message text;
    receiving into the messaging client, from a user, reply message text;
    establishing a reply message comprising the reply message text and only so much of the original message text as will fit together with at least the reply message text in a maximum message capacity; and
    sending the reply message.

11. The method of claim 10, wherein establishing the reply message comprises inserting after the reply message text only so much of the original message text as will fit together with at least the reply message text in the maximum message capacity.

12. The method of claim 10, wherein establishing the reply message comprises:

concatenating at least the reply message text and the original message text; and thereafter truncating a portion of the original message text so that the reply message does not exceed the maximum message capacity.

13. The method of claim 10, wherein a number of characters in the original message text equals the maximum message capacity, and wherein establishing the reply message comprises:

dynamically shifting out the end characters of the original message text as the user inputs the reply message text.

14. The method of claim 10, wherein establishing the reply message comprises:

determining if a threshold extent of the original message text fits within the maximum message capacity together with at least the reply message text;

in response to a determination that the threshold extent of the original message text does not fit within the maximum message capacity together with at least the reply message text, omitting the original message text altogether from the reply message.

15. The method of claim 14, further comprising:

dynamically establishing the threshold.

16. The method of claim 15, wherein dynamically establishing the threshold comprises:

determining a number of characters in a predefined starting portion of the original message text.

17. The method of claim 16, wherein the predefined starting portion of the original message text is a predefined number of starting words of the original message text.

18. For use in a wireless handheld device capable of communicating text messages, the device comprising:

a transceiver for receiving an original message from a wireless network and transmitting a reply message to the wireless network, wherein the reply message is limited to a maximum capacity;

user interface for receiving user input defining the reply message text;

a processor;

a data storage medium; and a set of machine language instructions stored in the data storage medium and executable by the processor, (i) to receive the original message comprising original message text, (ii) to receive the user input from the user interface and to establish the reply message comprising the reply message text and only so much of the original message text as will fit together with at least the reply message text in the maximum message capacity, and (iii) to send the reply message.

19. The device of claim 18, wherein the reply message is an SMS message.

20. The device of claim 18, wherein the data storage medium comprises an SMS application program.

\* \* \* \* \*